(12) United States Patent
Iwai

(10) Patent No.: US 7,385,646 B2
(45) Date of Patent: Jun. 10, 2008

(54) CAMERA WITH DRAWN EXTERIOR MEMBER HAVING DRAWN OPENING FOR RECEIVING CAMERA ELECTRONIC ASSEMBLY AND OPPOSING OPENING FOR RECEIVING CAMERA ELECTRONIC ASSEMBLY PROJECTION

(75) Inventor: Keita Iwai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 667 days.

(21) Appl. No.: 10/945,060

(22) Filed: Sep. 20, 2004

(65) Prior Publication Data

US 2005/0062882 A1 Mar. 24, 2005

(30) Foreign Application Priority Data

Sep. 22, 2003 (JP) ............................. 2003-330110

(51) Int. Cl.
*H04N 5/225* (2006.01)
(52) U.S. Cl. ....................................... 348/376
(58) Field of Classification Search ................ 348/373, 348/374, 376; 396/535, 539, 540, 541
See application file for complete search history.

(56) References Cited

U.S. PATENT DOCUMENTS

| | | | | |
|---|---|---|---|---|
| 4,506,533 A | * | 3/1985 | Hessel et al. ................... 72/42 |
| 5,721,963 A | * | 2/1998 | Iwagaki et al. ............... 396/535 |
| 5,917,545 A | * | 6/1999 | Kowno et al. ................ 348/373 |
| 6,540,415 B1 | * | 4/2003 | Slatter et al. ................. 348/373 |
| 2001/0010550 A1 | * | 8/2001 | Saito et al. ................... 348/373 |
| 2002/0136557 A1 | * | 9/2002 | Shimamura .................. 396/535 |
| 2003/0002876 A1 | * | 1/2003 | Baron ......................... 396/535 |
| 2004/0046869 A1 | * | 3/2004 | Dibella et al. ........... 348/207.99 |

FOREIGN PATENT DOCUMENTS

JP    H8 (1996)-55613    2/1996

* cited by examiner

*Primary Examiner*—Lin Ye
*Assistant Examiner*—Jason Whipkey
(74) *Attorney, Agent, or Firm*—Cowan, Liebowitz & Latman, P.C.

(57) ABSTRACT

The present invention discloses an image-taking apparatus which can be easily assembled. An image-taking apparatus has an image-pickup unit and an exterior member which is made of a metal and in which the image-pickup unit is inserted and contained. Here, the image-pickup unit has a projecting portion on an end face in a direction in which the image-pickup unit is inserted into the exterior member, the projecting portion projecting from the end face. The exterior member is produced by drawing and has a second opening portion in a face locating opposite to a first opening which is formed by drawing. The projecting portion projects out of the second opening portion.

7 Claims, 4 Drawing Sheets

US 7,385,646 B2

CAMERA WITH DRAWN EXTERIOR MEMBER HAVING DRAWN OPENING FOR RECEIVING CAMERA ELECTRONIC ASSEMBLY AND OPPOSING OPENING FOR RECEIVING CAMERA ELECTRONIC ASSEMBLY PROJECTION

BACKGROUND OF THE INVENTION

1. Field of the Invention

The present invention relates to an exterior member of an image-taking apparatus, and in particular, to an image-taking apparatus having a metal exterior member formed by drawing.

2. Description of Related Art

Conventional image-taking apparatuses such as digital still cameras and video cameras are composed of an image-pickup unit composed of a plurality of units such as an image-pickup lens unit, an illuminating unit, and a battery housing unit, and a exterior member which protects the image-pickup unit.

With a recent decrease in the size of image-taking apparatuses, an exterior member is often used which is obtained by drawing a thin metal plate.

The casing material of the recent image-taking apparatus is divided into a plurality of areas for an operation of assembling the exterior member with the image-pickup unit. To combine the divided exterior members together, it is necessary to provide an auxiliary member inside each exterior member.

Further, after the pluralities of exterior members have been assembled with the image-pickup unit, there may be a fine step in the combined part between two exterior members. Furthermore, if the combined part is located around an operation member operated by a user, a sufficient rigidity cannot be obtained by using only the exterior members.

To solve this problem, it is contemplated that an exterior member which is formed by drawing and which is thin but is integrally machined is applied to the image-taking apparatus as disclosed in Japanese Patent Application Laid-Open No.H8(1996)-55613.

However, the image-pickup unit is provided with a plurality of projecting portions such as operation buttons and a lens placed in a front surface of an illuminating unit which project from the surface of the exterior member. In this case, an operation of securing the projecting portions from the inside of the integrated exterior member is difficult.

Then, if the image-pickup unit having the projecting portions projecting from an outer surface of the exterior member is inserted into the integrated exterior member, the projecting portions may interfere with the exterior member. It is thus difficult to insert the image-pickup unit into the exterior member.

SUMMARY OF THE INVENTION

One aspect of an image-taking apparatus according to the present invention has an image-pickup unit and an exterior member which is made of a metal and in which the image-pickup unit is inserted and contained. Here, the image-pickup unit has a projecting portion on an end surface in a direction in which the image-pickup unit is inserted into the exterior member, the projecting portion projecting from the end surface. The exterior member is produced by drawing and has a second opening portion in a face locating opposite to a first opening which is formed by drawing. The projecting portion projects out of the opening.

Another aspect of an image-taking apparatus according to the present invention has an image-pickup unit and an exterior member which is made of a metal and in which the image-taking unit is inserted and contained. Here, the exterior member is produced by drawing. The image-pickup unit is provided with an inserting portion on the side of an opening of the exterior member, the opening is formed by drawing, a member which is installed in the image-pickup unit being inserted into the inserting portion through the opening.

Features of the image-taking apparatus of the present invention will be more apparent from the following description of a specific embodiment taken in conjunction with the drawings.

DETAILED DESCRIPTION OF THE PREFERRED EMBODIMENTS

Embodiment 1

Figure 1:
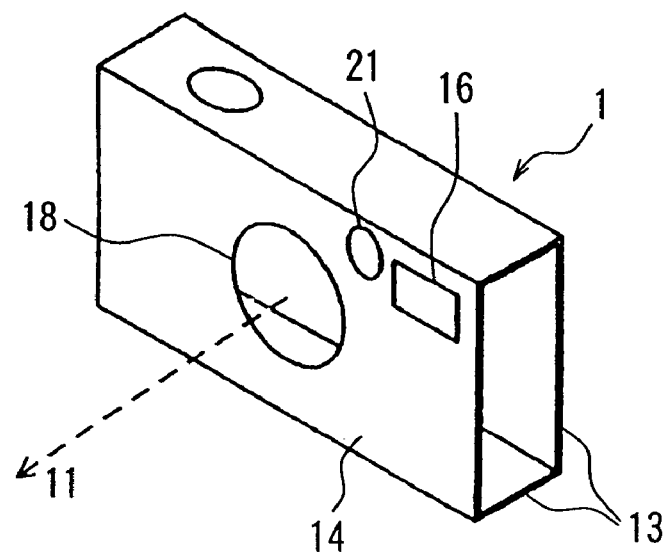
FIG. 1 is a perspective view of the appearance of a camera exterior member in a camera which is Embodiment 1 of the present invention.
Figure 2:
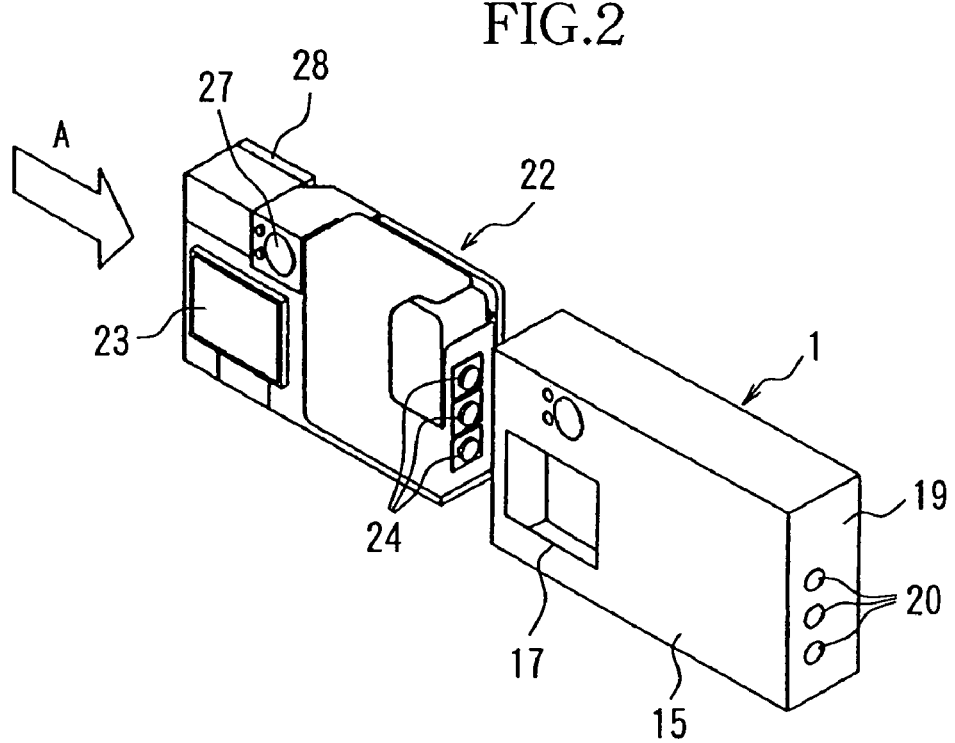
FIG. 2 is a perspective view of the appearance of the camera exterior member and a camera main body unit according to Embodiment 1.

FIG. 1 is a perspective view of the appearance of a camera exterior member of a camera which is Embodiment 1 of the present invention. FIG. 2 is a view illustrating how a camera main body unit is inserted into the camera exterior member.

In FIG. 1, reference numeral 1 denotes a camera exterior member constituting a casing of the camera, which is formed by drawing. As shown in FIG. 1, the camera exterior member 1 has an opening 13 (hereinafter referred to as a drawing opening), which is formed by inserting a tool at the time of drawing, in a direction different from that of an image-taking optical axis 11, that is, a direction orthogonal to the image-taking optical axis 11 and in a lateral direction of the camera.

Further, the camera exterior member 1 has a structure surface 14 which is a camera front surface orthogonal to a surface including the drawing opening 13. The structure surface 14 is provided with an opening 21 which ensures an optical path for a finder optical system, an opening 18 which allows a lens barrel to move in the direction of the image-taking optical axis 11, and an opening 16 from which a lens placed in a front surface of an illuminating unit 28, described later, is exposed, the openings being formed by another machining following drawing.

FIG. 2 is a view of the camera exterior member 1 as viewed from its rear surface. The camera exterior member 1 has a structure surface 15 locating opposite the structure surface 14. The structure surface 15 is provided with an opening 17 from which a liquid crystal display unit 23 displaying taken images, image-taking information, and the like is exposed. Further, a surface 19 of the camera exterior member 1 which is located opposite the surface including the drawing opening 13 is provided with a plurality of openings 20 through which a plurality of operation buttons 24 penetrate.

On the other hand, a camera main body unit 22 as an image-taking unit has the liquid crystal display unit 23, a finder unit 27, the illuminating unit 28, the operation buttons 24, and the like.

The dimensions of the liquid crystal display unit 23, finder unit 27, and illuminating unit 28 of the camera main body unit 22 are set to be smaller than those of inner wall surfaces of the camera exterior member 1, that is, the dimensions in the height direction, lateral direction, and thickness direction of the camera. Accordingly, these units are accommodated in the camera exterior member 1. Thus, in the direction of an arrow A in FIG. 2, when the camera main body unit 22 is housed in the camera exterior member 1, the camera main body unit 22 is prevented from partly interfering with the camera exterior member 1.

On the other hand, the operation buttons 24 of the camera main body unit 22 are not housed in the camera exterior member 1. The operation buttons 24 penetrate the openings 20 and partly project from the surface of the camera exterior member 1.

The operation buttons 24 are provided on a side of the camera main body unit 22 in the same direction as that in which the camera main body unit 22 is inserted as shown by the arrow A in FIG. 2. Thus, the camera main body unit 22 can be housed in the camera exterior member 1 without causing the operation buttons 24 to interfere with the inner wall surfaces of the camera exterior member 1.

As described above, according to the present embodiment, even if the operation buttons 24 being a part of the camera main body unit 22 project from the surface of the camera exterior member 1 after the camera has been assembled, the camera main body unit 22 can be housed in the camera exterior member 1 by being inserted into the camera exterior member 1 from the surface provided with the operation buttons 24, without causing the operation buttons 24 to interfere with the inner wall surfaces of the camera exterior member 1. This enables the camera to be easily assembled.

Further, the camera exterior member 1 is integrally formed by drawing, it is not necessary to provide auxiliary members inside of exterior members in order to combine the divided exterior members together as in the case of the prior art. Moreover, in contrast to the prior art, the combined part of the camera exterior members is not located near the operation buttons or the like. Thus, the strength of the camera exterior member 1 can be increased compared to the prior art.

Further, by drawing in the direction different from that of the image-taking optical axis, it is possible to integrally form the camera exterior member by deep drawing. This enables the number of combined parts to be reduced compared to the construction of the outer surface of the camera using a plurality of divided camera exterior members. Furthermore, the rigidity of the camera exterior member can be increased and an esthetically excellent camera can be provided.

Embodiment 2

Figure 3:
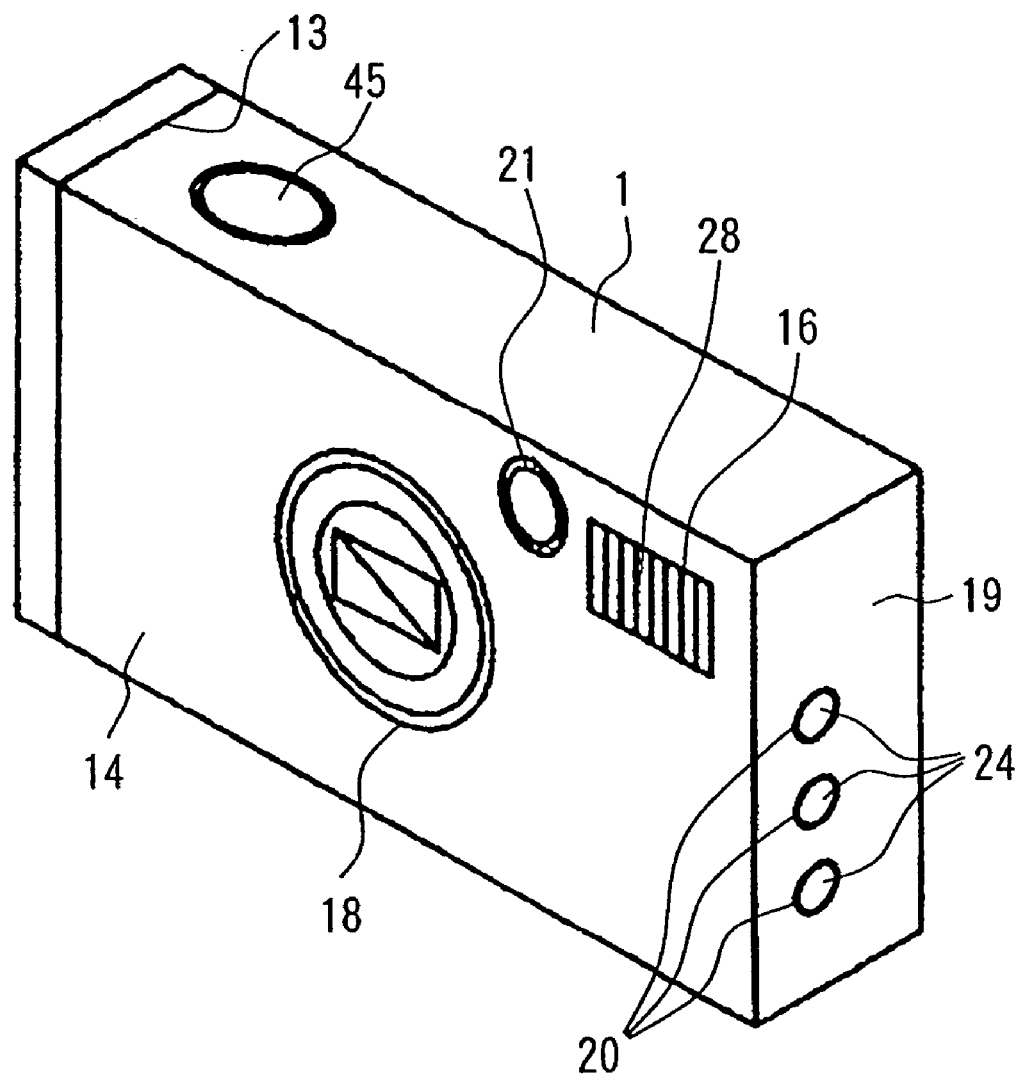
FIG. 3 is a perspective view of the appearance of a camera which is Embodiment 2 of the present invention.

FIG. 3 is a perspective view of the appearance of a camera which is Embodiment 2 of the present invention. The same members as those described in Embodiment 1 are denoted by the same reference numerals with their description omitted.

In FIG. 3, the operation buttons 24 of the camera project from the surface locating opposite the surface including the drawing opening 13, that is, a side 19 of the camera exterior member 1, as in the case of Embodiment 1.

A release button 45 projects out of an opening which formed in an area closer to the drawing opening 13 of a top surface of the camera constituting a part of the camera exterior member 1. Thus, when an image is to be taken, the side on which the release button 45 is placed is used as a grip portion.

By inserting the camera main body unit from the drawing opening 13, it is possible to assemble the camera without causing the camera main body unit to interfere with the camera exterior member 1 as in the case of Embodiment 1. Further, the operation buttons 24 are arranged in an area located opposite the grip portion. Accordingly, an inadvertent operation of the operation buttons 24 is repressed when the camera is held.

As described above, according to the present embodiment, the release button 45 is placed away from the operation buttons 24. Therefore, an inadvertent operation of the operation buttons 24 can be repressed.

Embodiment 3

Figure 4:
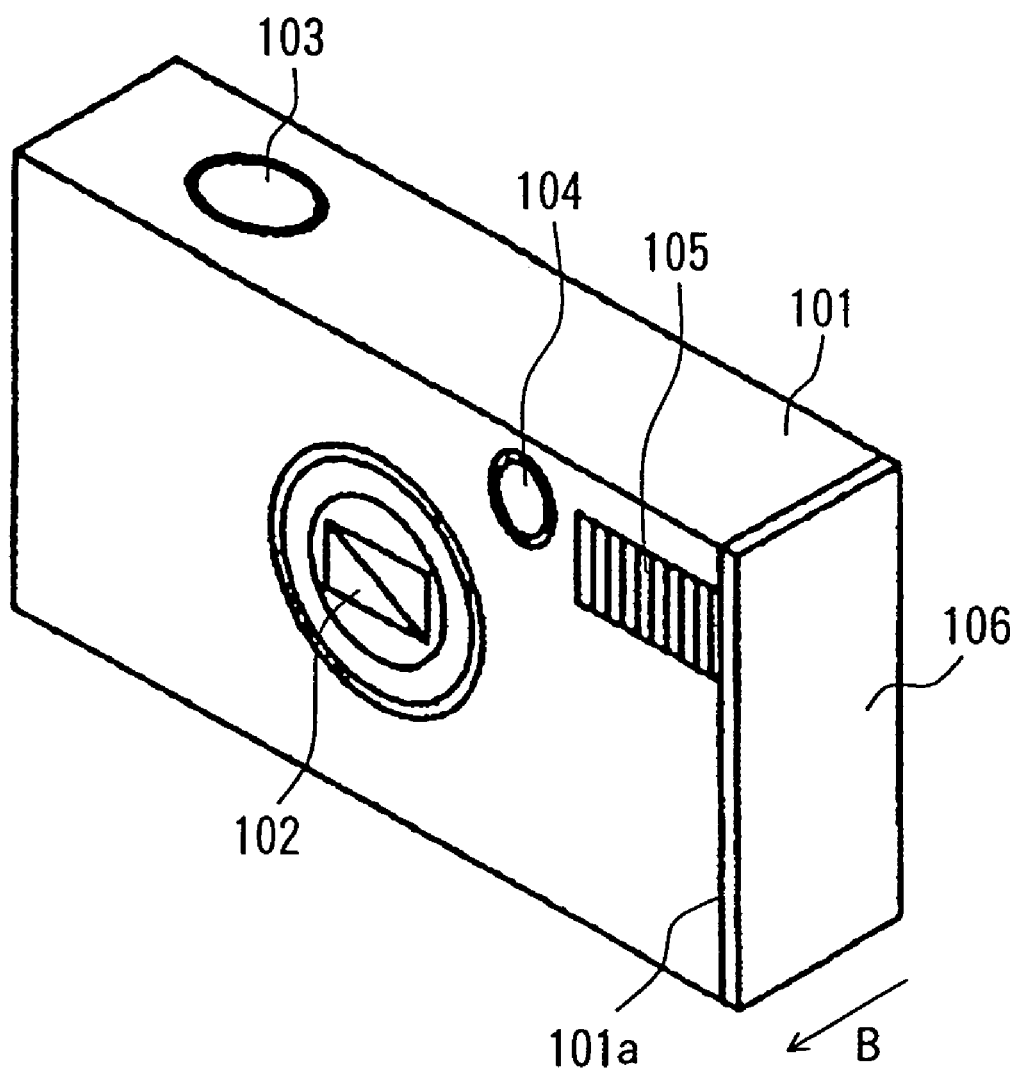
FIG. 4 is a perspective view of the appearance of a camera which is Embodiment 3 of the present invention.
Figure 5:
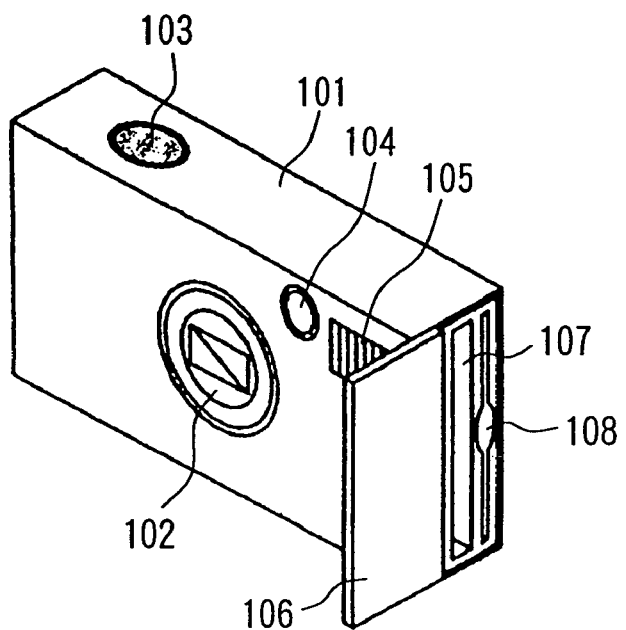
FIG. 5 is a perspective view of the appearance of the camera of Embodiment 3 in which a cover member is open.

FIG. 4 is a perspective view of the appearance of a camera which is Embodiment 3 of the present invention. FIG. 5 is a view showing that a cover member provided on a side of the camera of the present embodiment is open.

A camera exterior member 101 is formed by drawing in a direction orthogonal to the image-taking optical axis (the lateral direction of the camera). A camera main body unit (corresponding to the camera main body unit in FIG. 2) housed in the camera exterior member 101 has a lens barrel 102 which can move in the direction of the image-taking optical axis, a release button 103 used to start an image-taking operation and image-taking preparing operation (a focusing operation or a light metering operation), a finder 104 through which a subject is observed, and an illuminating unit including a Fresnel lens 105. These members are arranged as shown in FIG. 4.

As shown in FIG. 4, the camera exterior member 101 is provided with a cover member 106 constituting a part of the casing of the camera. The cover member 106 is placed so as to open and close a drawing opening 101a formed in the camera exterior member 101. Here, the cover member 106 can be slid in the thickness direction (the direction of an arrow B in FIG. 4) of the camera using a slide member (not shown) provided in the camera exterior member 101.

FIG. 5 shows that the cover member 106 is opened to expose a battery housing portion 107 and a recording medium housing portion 108 both formed in the camera main body unit. The battery housing portion 107 houses batteries as a power source for the camera. The recording medium housing portion 108 houses a recording medium which records image data taken by an image pickup element (a CCD sensor, a CMOS sensor, or the like) provided in the camera main body unit.

Instead of the above slide type, an opening and closing mechanism for the cover member 106 may be rotatably supported by the camera exterior member 101. In this case, the cover member 106 can be rotated around the axis of rotation to open and close the drawing opening 101a in the camera exterior member 101, that is, the opening for the battery housing portion 107 and recording medium housing portion 108.

Thus, if there are members such as batteries and recording media which are frequently installed in and removed from the camera main body, insertion ports for those members are arranged at the drawing opening 101a to enable the area of the drawing opening 101a side of the camera main body to be efficiently utilized. Further, the structure of the camera can be simplified. Furthermore, compared to the formation of the respective openings for the battery housing portion and recording medium housing portion in the camera exterior member, the number of openings can be reduced and the rigidity of the camera exterior member can be improved.

Further, by drawing in the direction different from that of the image-taking optical axis, it is possible to integrally form a camera exterior member by deep drawing. Furthermore, the only combined part of exterior members which part is formed on the outer surface of the camera is the abutting part between the cover member 106 and the camera exterior member 101. Consequently, compared to the use of a plurality of camera exterior members, the number of combined parts of the exterior members can be reduced.

Embodiment 4

Figure 6:
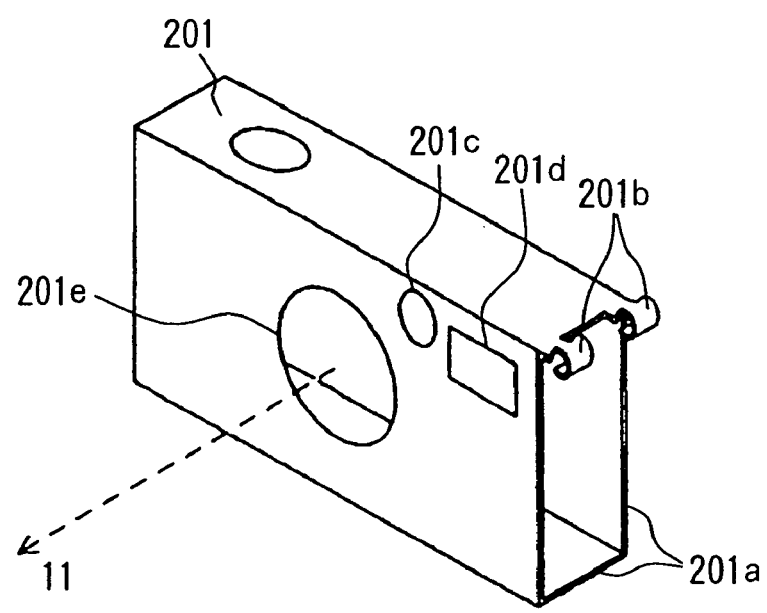
FIG. 6 is a perspective view of the appearance of a camera exterior member of a camera which is Embodiment 4 of the present invention.

FIG. 6 is a perspective view of the structure of a camera exterior member of a camera which is Embodiment 4 of the present invention.

A hinge portion 201b is formed on a camera exterior member 201 to attach a cover member to a side end of a drawing opening 201a. Openings 201c, 201d, and 201e corresponding to the openings 21, 16, and 18 in Embodiment 1 are formed in the camera exterior member 201.

The camera of the present embodiment is assembled by inserting a camera main body unit (similar to the camera main body unit 22, shown in FIG. 2) constituting the interior of the camera, from a drawing opening 201a formed in the camera exterior member 201. The camera exterior member 201 is formed by integrating up to five of the six surfaces covering the camera main body unit, excluding one located on a side of the camera. That is, the surfaces (up to five surfaces mentioned above) of the camera exterior member 201 other than the one including the drawing opening 201a are composed of continuous surfaces. Further, the hinge portion 201b is integrally formed on the drawing opening 201a of the camera exterior member 201. Accordingly, separate hinge parts need not be attached to the camera exterior member 201. This enables the number of parts to be reduced, thus reducing costs.

In the above embodiment, the drawing opening of the camera exterior member is formed at a position such that a surface formed by the drawing opening is orthogonal to a direction different from that of the image-taking optical axis 11. However, the drawing opening may be formed at a position such that the surface formed by the drawing opening is orthogonal to the image-taking optical axis. That is, in the camera according to the above embodiment, the camera exterior member can be molded by drawing so that the front or rear surface of the camera forms a drawing opening.

Further, various changes or improvements may be made to the above embodiments.

While preferred embodiments have been described, it is to be understood that modification and variation of the present invention may be made without departing from the scope of the following claims.

This application claims priority from Japanese Patent Application No. 2003-330110 filed on Sep. 22, 2003, which is hereby incorporated by reference herein.

What is claimed is:

1. A camera comprising:
   an assembly which is constructed by a plurality of camera electronic components for performing functions of the camera; and
   an exterior member which is made of a metal and constructs an exterior of the camera, the exterior member in which the assembly is inserted and contained in a fabrication stage of the camera,
   wherein the assembly includes a projecting portion on an end face in a direction in which the assembly is inserted into the exterior member, the projecting portion projecting from the end face, and
   wherein the exterior member is formed by drawing compound in a direction perpendicular to an image-taking optical axis of the camera and has a second opening portion in a face located opposite to a first opening which is formed by drawing compound and the projecting portion projects from the exterior member passing through the second opening portion.

2. The camera according to claim 1, wherein the projecting portion is an operation portion operated by a user.

3. The camera according to claim 1, wherein the first opening is located on a grip side of the camera.

4. A camera comprising:
   an assembly which is constructed by a plurality of camera electronic components for performing functions of the camera; and
   an exterior member which is made of a metal and constructs an exterior of the camera, the exterior member in which the assembly is inserted and contained in a fabrication stage of the camera,
   wherein the exterior member is formed by drawing compound in a direction perpendicular to an image-taking optical axis of the camera, and
   wherein the assembly is provided with an inserting portion on the side of an opening of the exterior member, the opening is formed by drawing compound, a member which is installed in the assembly being inserted into the inserting portion through the opening.

5. The camera according to claim 4, wherein the inserting portion is a housing portion for a battery.

6. The camera according to claim 4, wherein the inserting portion is a housing portion for a recording medium.

7. The camera according to claim 4, further comprising a cover member which opens and closes the opening, and
   wherein a hinge portion of the cover member is formed integrally with the exterior member.

* * * * *